(12) United States Patent
Hwang et al.

(10) Patent No.: US 11,374,271 B2
(45) Date of Patent: Jun. 28, 2022

(54) APPARATUS, SYSTEM, AND METHOD FOR COLLECTING GAS GENERATED IN SECONDARY BATTERY

(71) Applicant: LG Chem, Ltd., Seoul (KR)

(72) Inventors: Dongguk Hwang, Daejeon (KR); Su Hyun Kim, Daejeon (KR); Jeong Ae Ahn, Daejeon (KR); Nak Hee Choi, Daejeon (KR); Ji Hye Park, Daejeon (KR)

(73) Assignee: LG Energy Solution, Ltd.

( * ) Notice: Subject to any disclaimer, the term of this patent is extended or adjusted under 35 U.S.C. 154(b) by 214 days.

(21) Appl. No.: 16/616,218

(22) PCT Filed: Oct. 15, 2018

(86) PCT No.: PCT/KR2018/012076
§ 371 (c)(1),
(2) Date: Nov. 22, 2019

(87) PCT Pub. No.: WO2019/083207
PCT Pub. Date: May 2, 2019

(65) Prior Publication Data
US 2020/0176833 A1 Jun. 4, 2020

(30) Foreign Application Priority Data
Oct. 26, 2017 (KR) .................. 10-2017-0140218

(51) Int. Cl.
*H01M 10/52* (2006.01)
*H01M 10/42* (2006.01)
*H01M 50/308* (2021.01)

(52) U.S. Cl.
CPC ....... *H01M 10/52* (2013.01); *H01M 10/4285* (2013.01); *H01M 50/308* (2021.01); *H01M 10/4235* (2013.01)

(58) Field of Classification Search
None
See application file for complete search history.

(56) References Cited

U.S. PATENT DOCUMENTS

| 5,442,949 A | 8/1995 | Kinoshita et al. |
| 2005/0079620 A1 | 4/2005 | Eberhard et al. |

(Continued)

FOREIGN PATENT DOCUMENTS

| CN | 201820866 U | 5/2011 |
| CN | 203376189 U | 1/2014 |
| CN | 105954678 A | 9/2016 |

(Continued)

OTHER PUBLICATIONS

Extended European Search Report including Written Opinion for Application No. EP18869843.5, dated Oct. 5, 2020, pp. 1-9.

(Continued)

*Primary Examiner* — Lisa S Park
(74) *Attorney, Agent, or Firm* — Lerner, David, Littenberg, Krumholz & Mentlik, LLP

(57) ABSTRACT

The present invention relates to an apparatus, system, and method for collecting gas generated in a secondary battery, specifically, to an apparatus, system, and method for collecting gas, which allow an operator to collect gas generated inside a secondary battery according to a desired section.

15 Claims, 5 Drawing Sheets

(56) References Cited

U.S. PATENT DOCUMENTS

2012/0087834 A1\*    4/2012  Dutton ................ G01N 1/2226
                                                            422/83
2014/0057144 A1      2/2014  Yang

FOREIGN PATENT DOCUMENTS

| | | |
|---|---|---|
| CN | 104134772 B | 2/2017 |
| JP | H06308107 A | 11/1994 |
| JP | 2001332312 A | 11/2001 |
| JP | 2005134382 A | 5/2005 |
| JP | 2008004270 A | 1/2008 |
| JP | 2016207574 A | 12/2016 |
| JP | 2017181212 A | 10/2017 |
| KR | 100832245 B1 | 5/2008 |
| KR | 20120111080 A | 10/2012 |
| KR | 20140026089 A | 3/2014 |
| KR | 20160066906 A | 6/2016 |
| KR | 20160066909 * | 6/2016 |
| KR | 20160066909 A | 6/2016 |
| KR | 101634310 * | 7/2016 |
| KR | 20170078147 A | 7/2017 |
| KR | 101786991 B1 | 10/2017 |
| WO | 2017168864 A1 | 10/2017 |

OTHER PUBLICATIONS

International Search Report from Application No. PCT/KR2018/012076 dated Jan. 21, 2019, 2 pages.

\* cited by examiner

APPARATUS, SYSTEM, AND METHOD FOR COLLECTING GAS GENERATED IN SECONDARY BATTERY

CROSS-REFERENCE TO RELATED APPLICATIONS

The present application is a national phase entry under 35 U.S.C. § 371 of International Application No. PCT/KR2018/012076, filed on Oct. 15, 2018, published in Korean, which claims priority to Korean Patent Application No. 10-2017-0140218, filed on Oct. 26, 2017, the disclosures of which are hereby incorporated herein by reference in their entireties.

TECHNICAL FIELD

The present invention relates to a device for collecting gas generated in a secondary battery, and a system and a method therefor, and specifically, relates to a gas collecting device that allows an analyzer to collect the gas generated in a secondary battery by a desired section, a system for collecting gas and a method for collecting gas.

BACKGROUND ART

As a method of collecting gas generated in a secondary battery, the secondary battery was put in a closed space and then vacuum decompressed. Then, a hole is drilled in the secondary battery to diffuse the gas and the sample is collected. Otherwise, a jig was connected to the outside of the secondary battery, and the secondary battery was punctured and then the gas was collected. The prior art references related to this include K. Kumai et al., J. of Power Sources 81-82(1999) 715-719 and Korean Patent No. 10-1590395.

On the other hand, the conventional method of vacuum decompressing a secondary battery, piercing a hole in the secondary battery, diffusing gas and then collecting a sample is a way to collect and detect inner gas in a vacuum state. Thus, there are problems of contamination of the sample and difficulty in collecting the sample accurately.

Further, in the conventional method of using a jig, there is a concern that the jig may be damaged when the secondary battery is ignited or the temperature rises, and there is a concern that a hole in the surface of the secondary battery may damage the content inside the secondary battery. Further, due to the space occupied by the jig, it is difficult to apply other equipment to the secondary battery.

DISCLOSURE

Technical Problem

In order to overcome these difficulties of the prior art, a device, a system and a method capable of directly collecting gas generated in the secondary battery without using a jig are needed. Further, a device, a system and a method allowing to collect gas generated in the secondary battery by an operator's desired section such as charging section, time, process, state of charge (SOC), temperature, etc., and allowing to ensure the safety of an operator from danger due to ignition/explosion of the secondary battery and temperature rise of the secondary battery are needed.

Technical Solution

The gas collecting device of a secondary battery for collecting gas generated in the secondary battery according to one embodiment of the present invention is characterized by comprising:

at least one gas collecting part which can collect the gas generated in the secondary battery;

a main opening and closing part connected to the at least one gas collecting part, wherein the gas collecting device is connected to the secondary battery through a pipe or a tube, and the main opening and closing part opens and closes the connection of the gas collecting device to the pipe or the tube;

a first pressure sensor positioned between the main opening and closing part and the pipe or the tube and capable of sensing a change in pressure due to increase or decrease in the amount of gas in the secondary battery;

a second pressure sensor connected to the at least one gas collecting part and capable of sensing a change in internal pressure of the device, wherein the gas collecting device is connected to the secondary battery through the pipe or the tube to collect the gas generated in the secondary battery into the gas collecting part.

Further, the gas collecting device according to one embodiment of the present invention may further comprise at least one opening and closing part of the gas collecting part, wherein each of the at least one opening and closing part of the gas collecting part may be connected to the at least one gas collecting part, respectively, to open and close each of the gas collecting part, and the opening and closing part of the gas collecting part may be positioned between the gas collecting part and the main opening and closing part, and between the gas collecting part and the second pressure sensor.

Further, the gas collecting device according to one embodiment of the present invention may further comprise an opening and closing part of a vacuum pump, which can be connected to a vacuum pump capable of removing interfering gas in the gas collecting device and in the secondary battery; and capable of opening and closing the connection to the vacuum pump.

Further, in the gas collecting device according to one embodiment of the present invention, there may be a plurality of pairs of the gas collecting part and the opening and closing part of the gas collecting part, and opening and closing of the opening and closing part of the gas collecting part may be controlled, respectively, so that the gas generated in the secondary battery can be collected in a different gas collecting part according to a desired section.

Further, in the gas collecting device according to one embodiment of the present invention, the gas collecting part may be pipe-shaped.

Further, in the gas collecting device according to one embodiment of the present invention, the material of the gas collecting part may include at least one selected from the group consisting of stainless steel, Teflon, metal, plastic and a combination thereof.

Further, in the gas collecting device according to one embodiment of the present invention, the volume of the internal space of the gas collecting part may be 1 ml to 1000 ml.

Further, in the gas collecting device according to one embodiment of the present invention, the opening and closing part of the gas collecting part may be a ball valve.

Further, the gas collecting system of a secondary battery for collecting gas generated in the secondary battery according to the present invention may comprise:

the above-described gas collecting device;

the pipe or the tube connecting the gas collecting device and the secondary battery;

a vacuum pump capable of removing interfering gas in the gas collecting device and in the secondary battery; and a control device capable of controlling opening and closing of the main opening and closing part, wherein the secondary battery may be positioned inside an explosion-proof chamber, and the gas collecting device, the vacuum pump and the control device may be positioned outside the explosion-proof chamber.

Further, the gas collecting system of a secondary battery for collecting gas generated in the secondary battery according to one embodiment of the present invention may comprise:

the above-described gas collecting device;

the pipe or the tube connecting the gas collecting device and the secondary battery; and a vacuum pump capable of removing interfering gas in the gas collecting device and in the secondary battery.

Further, the method for collecting gas generated in the secondary battery into the gas collecting device by using the gas collecting system of a secondary battery for collecting gas generated in the secondary battery according to one embodiment of the present invention may comprise the following steps of:

connecting the secondary battery and the gas collecting device with the pipe or the tube; and controlling opening and closing of the main opening and closing part with the control device to collect the gas generated in the secondary battery into the gas collecting part.

Further, the method for collecting gas generated in the secondary battery into the gas collecting device by using the gas collecting system of a secondary battery for collecting gas generated in the secondary battery according to one embodiment of the present invention may comprise the following steps of:

connecting the secondary battery and the gas collecting device with the pipe or the tube; and controlling opening and closing of the main opening and closing part and the opening and closing part of the gas collecting part with the control device, respectively, to collect the gas generated in the secondary battery into the gas collecting part.

Further, the method for collecting gas generated in the secondary battery into the gas collecting device by using the gas collecting system of a secondary battery for collecting gas generated in the secondary battery according to one embodiment of the present invention may comprise the following steps of:

connecting the secondary battery and the gas collecting device with the pipe or the tube; and controlling opening and closing of the main opening and closing part, the opening and closing part of the gas collecting part, and the opening and closing part of a vacuum pump with the control device, respectively, to collect the gas generated in the secondary battery into the gas collecting part.

Further, the method for collecting gas generated in the secondary battery into the gas collecting device by using the gas collecting system of a secondary battery for collecting gas generated in the secondary battery according to one embodiment of the present invention may comprise the following steps of:

connecting the secondary battery and the gas collecting device with the pipe or the tube; and collecting the gas generated in the secondary battery into the gas collecting part.

Advantageous Effects

The present invention has advantages that it can directly collect the gas generated in the secondary battery without using a jig by an operator's desired section such charging section, time, process, SOC, temperature, etc., and can ensure the safety of an operator from danger due to overcharge, ignition/explosion of the secondary battery and temperature rise of the secondary battery.

DESCRIPTION OF DRAWINGS

FIG. 2b illustrates a part of the components of the device for collecting gas generated in a secondary battery 10 of FIG. 2a.

FIG. 3b is a graph exemplarily showing the results of analyzing composition and content of the gas collected by the desired section in Test Example of FIG. 3a.

BEST MODE CARRYING OUT THE INVENTION

Figure 1:
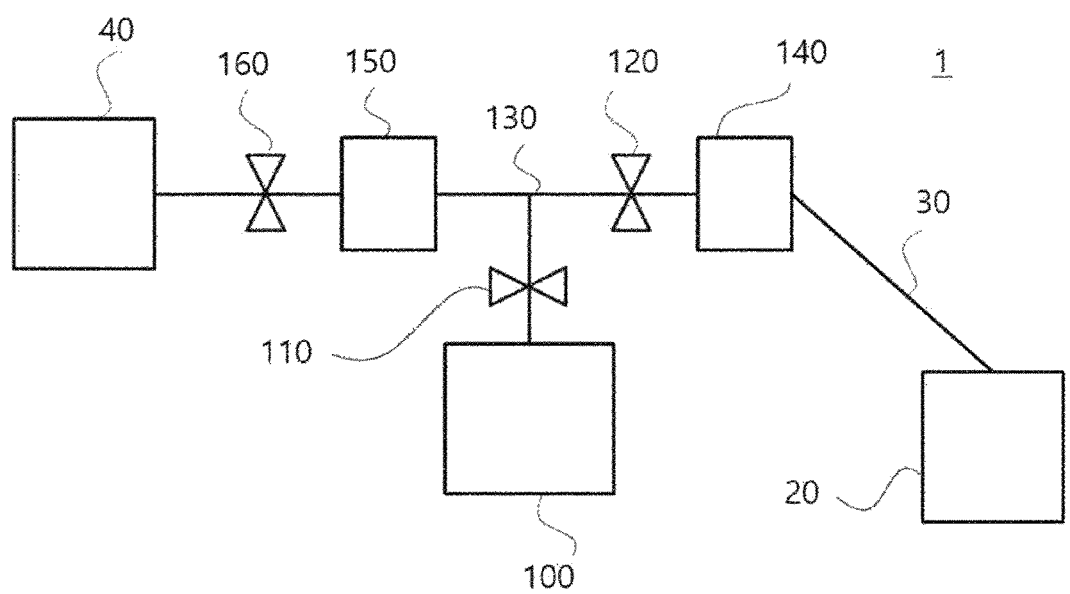
FIG. 1 illustrates a conceptual diagram of the inner gas collecting system 1 of the secondary battery according to one embodiment of the present invention.

The gas collecting device of a secondary battery for collecting gas generated in the secondary battery according to one embodiment of the present invention is characterized by comprising:

at least one gas collecting part which can collect the gas generated in the secondary battery;

a main opening and closing part connected to the at least one gas collecting part, wherein the gas collecting device is connected to the secondary battery through a pipe or a tube, and the main opening and closing part opens and closes the connection of the gas collecting device to the pipe or the tube;

a first pressure sensor positioned between the main opening and closing part and the pipe or the tube and capable of sensing a change in pressure due to increase or decrease in the amount of gas in the secondary battery;

a second pressure sensor connected to the at least one gas collecting part and capable of sensing a change in internal pressure of the device, wherein the gas collecting device is connected to the secondary battery through the pipe or the tube to collect the gas generated in the secondary battery into the gas collecting part.

Further, the gas collecting device according to one embodiment of the present invention may further comprise at least one opening and closing part of the gas collecting part, wherein each of the at least one opening and closing part of the gas collecting part may be connected to the at least one gas collecting part, respectively, to open and close each of the gas collecting part, and the opening and closing part of the gas collecting part may be positioned between the gas collecting part and the main opening and closing part, and between the gas collecting part and the second pressure sensor.

Further, the gas collecting device according to one embodiment of the present invention may further comprise an opening and closing part of a vacuum pump, which can be connected to a vacuum pump capable of removing interfering gas in the gas collecting device and in the secondary battery; and capable of opening and closing the connection to the vacuum pump.

Further, in the gas collecting device according to one embodiment of the present invention, there may be a plurality of pairs of the gas collecting part and the opening and closing part of the gas collecting part, and opening and closing of the opening and closing part of the gas collecting part may be controlled, respectively, so that the gas generated in the secondary battery can be collected in a different gas collecting part according to a desired section.

Further, in the gas collecting device according to one embodiment of the present invention, the gas collecting part may be pipe-shaped.

Further, in the gas collecting device according to one embodiment of the present invention, the material of the gas collecting part may include at least one selected from the group consisting of stainless steel, Teflon, metal, plastic and a combination thereof.

Further, in the gas collecting device according to one embodiment of the present invention, the volume of the internal space of the gas collecting part may be 1 ml to 1000 ml.

Further, in the gas collecting device according to one embodiment of the present invention, the opening and closing part of the gas collecting part may be a ball valve.

Further, the gas collecting system of a secondary battery for collecting gas generated in the secondary battery according to the present invention may comprise:
the above-described gas collecting device;
the pipe or the tube connecting the gas collecting device and the secondary battery;
a vacuum pump capable of removing interfering gas in the gas collecting device and in the secondary battery; and
a control device capable of controlling opening and closing of the main opening and closing part,
wherein the secondary battery may be positioned inside an explosion-proof chamber, and the gas collecting device, the vacuum pump and the control device may be positioned outside the explosion-proof chamber.

Further, the gas collecting system of a secondary battery for collecting gas generated in the secondary battery according to one embodiment of the present invention may comprise:
the above-described gas collecting device;
the pipe or the tube connecting the gas collecting device and the secondary battery; and
a vacuum pump capable of removing interfering gas in the gas collecting device and in the secondary battery.

Further, the method for collecting gas generated in the secondary battery into the gas collecting device by using the gas collecting system of a secondary battery for collecting gas generated in the secondary battery according to one embodiment of the present invention may comprise the following steps of:
connecting the secondary battery and the gas collecting device with the pipe or the tube; and
controlling opening and closing of the main opening and closing part with the control device to collect the gas generated in the secondary battery into the gas collecting part.

Further, the method for collecting gas generated in the secondary battery into the gas collecting device by using the gas collecting system of a secondary battery for collecting gas generated in the secondary battery according to one embodiment of the present invention may comprise the following steps of:
connecting the secondary battery and the gas collecting device with the pipe or the tube; and
controlling opening and closing of the main opening and closing part and the opening and closing part of the gas collecting part with the control device, respectively, to collect the gas generated in the secondary battery into the gas collecting part.

Further, the method for collecting gas generated in the secondary battery into the gas collecting device by using the gas collecting system of a secondary battery for collecting gas generated in the secondary battery according to one embodiment of the present invention may comprise the following steps of:
connecting the secondary battery and the gas collecting device with the pipe or the tube; and
controlling opening and closing of the main opening and closing part, the opening and closing part of the gas collecting part, and the opening and closing part of a vacuum pump with the control device, respectively, to collect the gas generated in the secondary battery into the gas collecting part.

Further, the method for collecting gas generated in the secondary battery into the gas collecting device by using the gas collecting system of a secondary battery for collecting gas generated in the secondary battery according to one embodiment of the present invention may comprise the following steps of:
connecting the secondary battery and the gas collecting device with the pipe or the tube; and
collecting the gas generated in the secondary battery into the gas collecting part.

[Mode for Invention]

Hereinafter, a device for collecting gas generated in a secondary battery, and a system and a method therefor according to the present invention will be explained in detail. The accompanying drawings are provided for illustration only and should not be construed as limiting the scope of the invention.

In addition, the same or corresponding components are given by the same or similar reference numerals, regardless of the reference numerals in the drawings, for which the repeated explanation will be omitted, and for convenience of description, the size and shape of each illustrated structural member may be exaggerated or downsized.

Figure 2A:
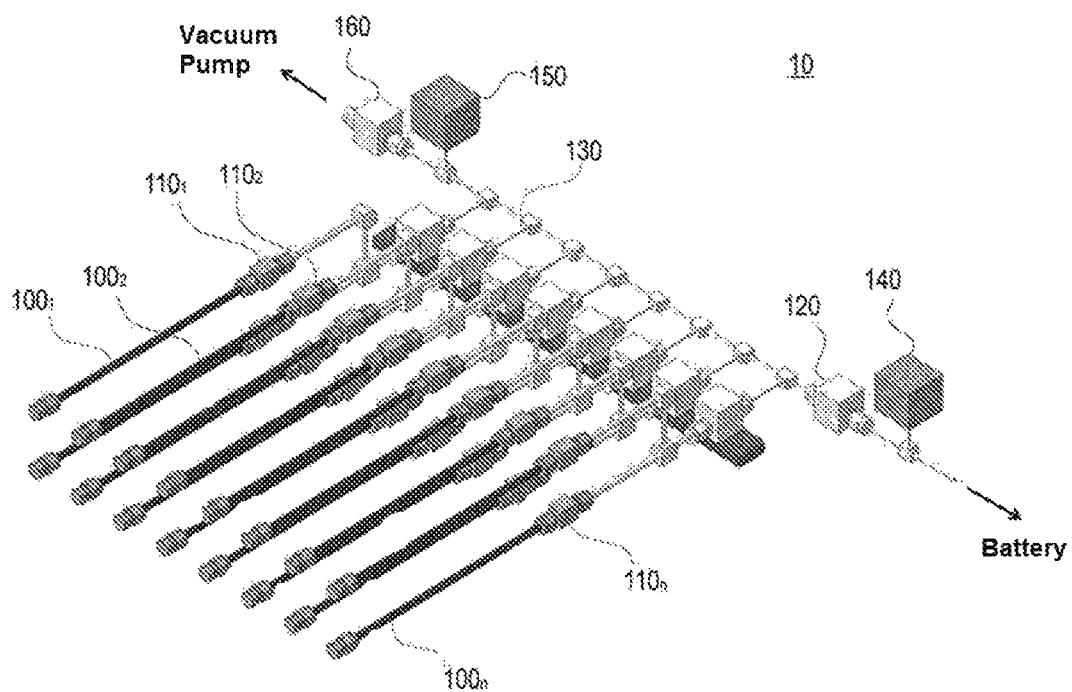
FIG. 2a illustrates a drawing when the device for collecting gas generated in a secondary battery 10 according to FIG. 1 is exemplarily implemented.
Figure 2B:
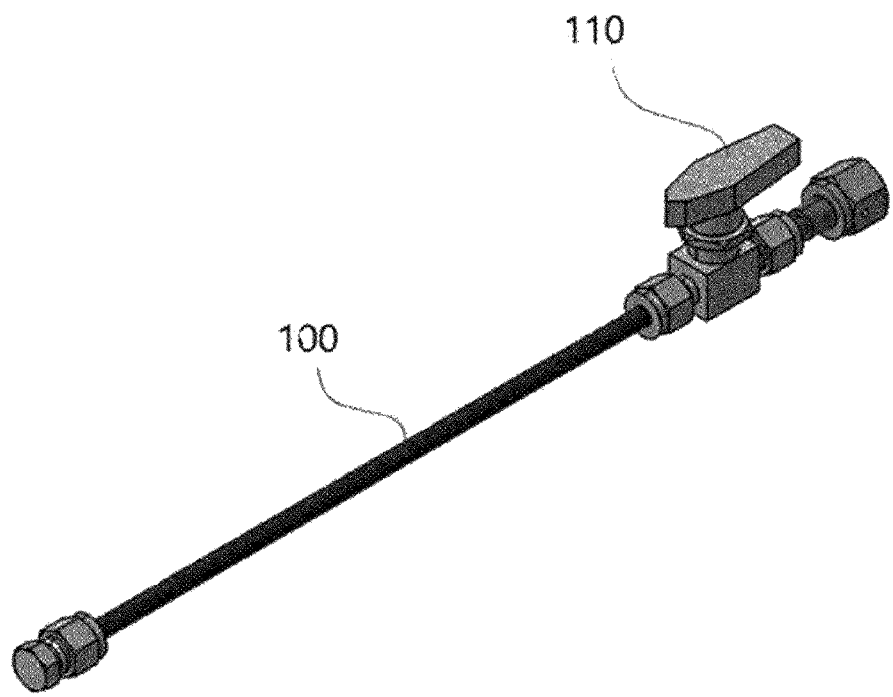

FIG. 1 illustrates an conceptual diagram of the system for collecting inner gas of a secondary battery 1 containing the device for collecting gas generated in a secondary battery 10 according to one embodiment of the present invention, FIG. 2a illustrates a drawing when the device for collecting gas generated in a secondary battery 10 according to FIG. 1 is exemplarily implemented, and FIG. 2b illustrates a part of the components of the device for collecting gas generated in a secondary battery 10 of FIG. 2a.

First, referring to FIG. 1, the system for collecting inner gas of a secondary battery 1 comprises a device for collecting gas generated in a secondary battery 10, a secondary battery 20, a pipe or a tube 30 connecting the secondary battery 20 and the gas collecting device 10, a vacuum pump 40, and a control device (not shown). Examples of the secondary battery 20 include a lithium secondary battery, an all-solid-state secondary battery, a lithium metal secondary battery and the like.

The device for collecting gas generated in a secondary battery (hereinafter, called 'gas collecting device') 10 comprises a gas collecting part 100, an opening and closing part of the gas collecting part 110, a main opening and closing part 120, a connecting member 130, a first pressure sensor 140, a second pressure sensor 150, and an opening and closing part of a vacuum pump 160.

The gas collecting part 100 can collect the gas generated in the secondary battery from the secondary battery 20 (see, FIG. 2a) during a desired section. The gas collecting part 100 may have a pipe shape with a predetermined volume, but the present invention is not limited to the shape shown in FIG. 1, and various modifications and changes can be made within a range capable of accommodating the gas therein. The material of the opening and closing part of the gas collecting part 110 may include at least one selected from the group consisting of stainless steel, Teflon, metal, plastic and a combination thereof. The volume of the internal space capable of collecting the gas of the gas collecting part 100 may be, for example, 1 ml to 1000 ml. The gas collecting device 10 may further comprise an opening and closing part of the gas collecting part 110, which is connected to the gas collecting part 100 and opens and closes the gas collecting part 100. The opening and closing part of the gas collecting part 110 may be a diaphragm valve, a ball valve or a needle valve. The present invention is not limited thereto, and various modifications and changes can be made to the opening and closing members such as valves that can open/close the gas collecting part 100.

The gas collecting device 10 according to the present invention may comprise at least one gas collecting part 100. As shown in FIG. 2a, a plurality of the gas collecting parts $100_1$, $100_2$, ... $100_n$ and opening and closing part of the gas collecting parts connected to each of the gas collecting part 100. Therefore, by the desired section, for example, the gas generated in the secondary battery 20 may be divided by the charging sections of the secondary battery 20 and stored in the gas collecting parts $100_1$, $100_2$, ... $100_n$, respectively. More specifically, for example, in the first charging section (initial charging section) of the secondary battery 20, by opening the first opening and closing part of the gas collecting part $110_1$ and closing the remaining opening and closing parts of the gas collecting parts $100_2$, ... $100_n$, the gas generated in the first charging section of the secondary battery 20 is collected into only the first gas collecting part $100_1$. In the second charging section of the secondary battery 20, by closing the first opening and closing part of the gas collecting part $110_1$ and opening only the second opening and closing part of the gas collecting part $110_2$, the gas generated in the second charging section of the secondary battery 20 is collected into only the second gas collecting part $100_2$. In the last charging section of the secondary battery 20, by opening only the nth opening and closing part of the gas collecting part $110_n$, the gas generated in the last charging section of the secondary battery 20 can be collected into only the nth gas collecting part $100_n$. The present invention is not limited to the above description, and it is possible to control the number of the gas collecting part 100 that is opened according to each charging section or each step of the process (i.e., the gas is collected).

Further, although opening and closing of at least one opening and closing part of the gas collecting part 110 can be manually controlled by an operator, at least one opening and closing part of the gas collecting part 110 may be connected to a control device (not shown) to allow the operator to open and close the opening and closing part of the gas collecting part 110, and opening and closing of the opening and closing part of the gas collecting part 110 may be automatically controlled as the operator pre-sets the control device. Further, the gas collecting device 10 comprises a main opening and closing part 120 connected to the at least one gas collecting part 100. The main opening and closing part 120 is connected to the secondary battery 20 through a pipe or a tube 30 to be described later, and can open and close the connection of the gas collecting device 10 to the pipe or the tube 30. The main opening and closing part 120 may be, for example, a valve, or, for example, a diaphragm valve, a ball valve or a needle valve. However, the present invention is not limited thereto, and various modifications and changes can be made to the opening and closing members having an open/close) function. As described above, in the case that the opening and closing part of the gas collecting part 110 is connected to the gas collecting part 100, the main opening and closing part 120 is connected to at least one opening and closing part of the gas collecting part 110. Further, as shown in FIG. 2a, between the gas collecting part 100 and the main opening and closing part 120, the device may further comprise a connecting member 130 connecting the gas collecting part 100 and the main opening and closing part 120.

The connecting member 130 can connects a plurality of the gas collecting parts $100_1$, $100_2$, ... $100_n$. Further, the opening and closing part of the gas collecting part 110, a second pressure sensor 150 to be described later and the like can be positioned on the connecting member 130. The connecting member 130 may contain at least one selected from the group consisting of a pipe, a tube, a nipple, a stainless tubing (SUS tubing), a Teflon tubing, a nut, a ferrule, a union and a combination thereof.

The pipe or the tube 30 directly connected to the secondary battery 20 can be connected to the main opening and closing part 120. Namely, the pipe or the tube 30 directly connects the secondary battery 20 and the gas collecting device 10 so that the gas generated in the secondary battery 20 moves to the gas collecting device 10 through the pipe or the tube 30. When connecting the secondary battery 20 to the gas collecting device 10, a jig is not used. The secondary battery 20 may include a port that allows the pipe or the tube 30 to be installed directly on the secondary battery 20. The port that can be included to the secondary battery 20 to connect the pipe or the tube 30 is sufficient if it can connect the secondary battery 20 to the pipe or the tube 30.

The first pressure sensor 140 can be connected to the part where the pipe or the tube 30 is connected to the main opening and closing part 120 or to the middle of the pipe or the tube 30. The change in pressure due to the increase or decrease in the amount of the gas generated in the secondary battery 20 can be checked by the first pressure sensor 140. Further, the second pressure sensor 150 can be connected between the main opening and closing part 120 and the gas collecting part 100. The change in pressure in the gas collecting device 10 can be checked by the second pressure sensor 150. In the case that the opening and closing part of the gas collecting part 110 is connected to the gas collecting part 100, the main opening and closing part 120, the opening and closing part of the gas collecting part 110 and the second pressure sensor 150 can be connected. In the case that the gas collecting device 10 further include the connecting member 130, as shown in FIG. 2a, the second pressure sensor 150 can be positioned on the connecting member 130.

Further, the gas collecting device 10 may further comprise a vacuum pump 40 that can remove the gas (interfering gas or unnecessary gas and the like) in the secondary battery 20 and the gas collecting device 10. The vacuum pump 40 can be connected to the gas collecting part 100. In the case that the opening and closing part of the gas collecting part 110 is connected to the gas collecting part 100, the vacuum pump 40 can be connected to the opening and closing part of the gas collecting part 110. In the case that the connecting member 130 is connected to the gas collecting part 100 and/or the opening and closing part of the gas collecting part 110, the vacuum pump 40 can be connected to the connecting member 130. The gas collecting device 10 may further comprise an opening and closing part of a vacuum pump 160 that opens and closes the connection between the gas collecting device 10 and the vacuum pump 40 at the part connected to the vacuum pump 40. Or, the opening and closing part of a vacuum pump 160 can be positioned at the front end of the vacuum pump 40. The opening and closing part of a vacuum pump 160 may be, for example, a valve, or, for example a diaphragm valve, a ball valve or a needle valve. However, the present invention is not limited thereto, and various modifications and changes can be made to the opening and closing members having an open/close) function.

According to the present invention, as described above, an operator can collect the gas generated in the secondary battery by the operator's desired section such as charging section, time, process, SOC, temperature, etc., by connecting the gas collecting device 10 of FIG. 1 and FIG. 2a to the secondary battery 20 through the pipe or the tube 30 and controlling the opening and closing part of the gas collecting part 110 and/or the main opening and closing part 120 and/or the opening and closing part of a vacuum pump 160. The gas generated in the secondary battery 20 and then collected into the gas collecting part 100 can be used for qualitative and quantitative analysis using GC/FID, TCD, MSD and the like by the operator. At this time, opening and closing of each of the opening and closing part of the gas collecting part 110, the main opening and closing part 120 and the opening and closing part of a vacuum pump 160 can be controlled by the control device (not shown) remotely.

Further, the secondary battery 20 can be installed inside the explosion-proof chamber, and the gas collecting device 10 can be installed outside the explosion-proof chamber to minimize direct contact of a researcher to charging, overcharging and high temperature exposure of the secondary battery during collecting the gas. Accordingly, the safety of the researcher and the gas collecting device 10 can be ensured due to the danger of ignition/explosion of the secondary battery and temperature rise of the secondary battery. In addition, as described above, since the opening and closing part of the gas collecting part 110 and/or the main opening and closing part 120 and/or the opening and closing part of a vacuum pump 160 can be controlled by the control device remotely, the safety of the researchers can be ensured more.

Hereinafter, according to the present invention, a method for collecting inner gas of a secondary battery by using the system for collecting inner gas of a secondary battery is provided. First, a port of the secondary battery 20 and the gas collecting device 10 are directly connected through the pipe or the tube 30 (Step 1). The term "directly connected" means that the secondary battery 20 and the gas collecting device 10 are connected without using a jig and the like. At this time, the secondary battery 20 can be installed inside the explosion-proof chamber, and the gas collecting device 10 can be installed outside the explosion-proof chamber.

The step of directly connecting the secondary battery 20 and the gas collecting device 10 through the pipe or the tube 30 comprises the step of installing the main opening and closing part 120 to the pipe or the tube 30 (Step 1a). In the case that only one gas collecting part 100 is required, the main opening and closing part 120 may be connected to one gas collecting part 100 to be connected to the pipe or the tube 30. Further, in the case that a plurality of gas collecting parts $100_1, 100_2, \ldots 100_n$ are required, each of the gas collecting parts $100_1, 100_2, \ldots 100_n$ may be connected to the main opening and closing part 120. In addition, the connecting member 130 may also connect between the gas collecting part 100 ($100_1, 100_2, \ldots 100_n$ and the main opening and closing part 120.

Further, the step 1 of directly connecting the secondary battery 20 and the gas collecting device 10 through the pipe or the tube 30 may comprise the step of installing the opening and closing part of the gas collecting part 110 also to the gas collecting part 100 (Step 1b). In the case that only one gas collecting part 100 is required, the opening and closing part of the gas collecting part 110 can be installed on one gas collecting part 100. Further, in the case that a plurality of gas collecting parts $100_1, 100_2, \ldots 100_n$ are required, each of the opening and closing part of the gas collecting part $110_1, 110_2, \ldots 110_n$ may be connected to each of the gas collecting parts $100_1, 100_2, \ldots 100_n$.

Further, the step 1 of directly connecting the secondary battery 20 and the gas collecting device 10 through the pipe or the tube 30 may comprise the step of connecting the gas collecting part 100 to the vacuum pump 40 (Step 1c). The opening and closing part of a vacuum pump 160 may be further included between the gas collecting part 100 and the vacuum pump 40.

The step 1a to the step 1c may be conducted in any order. Namely, any one step of the step 1a to the step 1c may be performed first, the other one step of the step 1a to the step 1c may be performed, and then the remaining one step may be performed.

Then, by controlling opening and closing of each of the opening and closing part of the gas collecting part 110, the main opening and closing part 120 and the opening and closing part of a vacuum pump 160, the gas generated in the secondary battery 20 is collected into the gas collecting part 100 (Step 2). At this time, the gas generated in the secondary battery 20 can be collected by the operator's desired section such as charging section, time, process, SOC, temperature, etc. Further, as described above, opening and closing of each of the opening and closing part of the gas collecting part 110, the main opening and closing part 120 and the opening and closing part of a vacuum pump 160 can be controlled by the control device. The control device can be installed away from the explosion-proof chamber in which the secondary battery 20 is placed to ensure the operator's safety.

Further, the step 2 of collecting the gas into the gas collecting part 100 may further comprise the step of controlling the opening and closing part of a vacuum pump 160 and vacuum decompressing the gas collecting part 100 (Step 2a).

TEST EXAMPLE

Figure 3A:
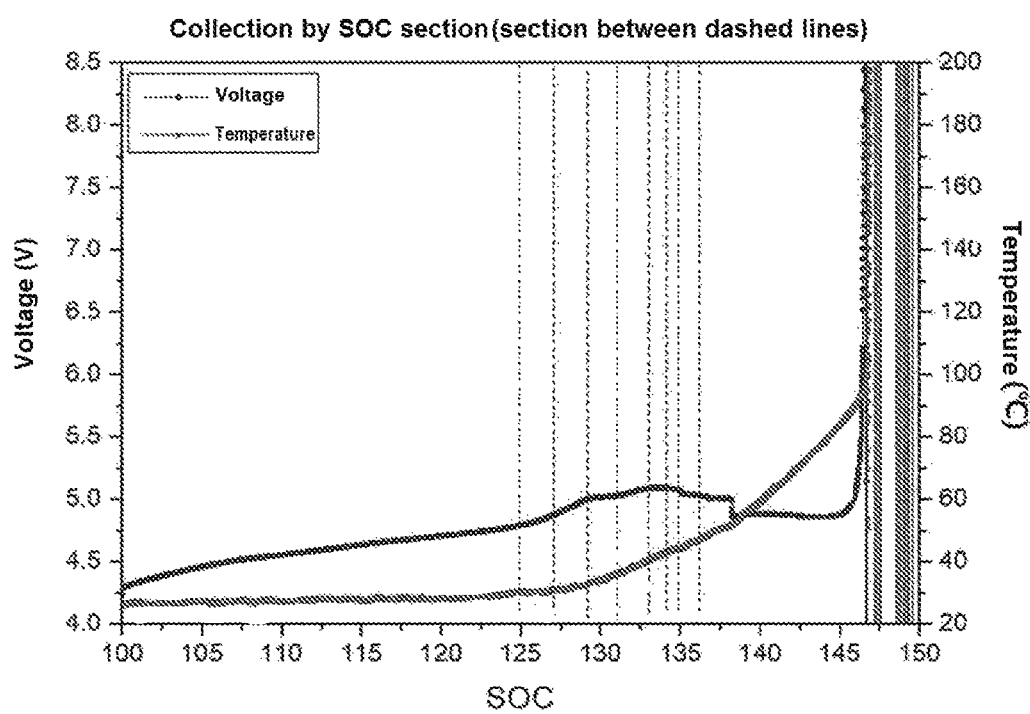
FIG. 3a is a graph exemplarily showing the desired gas collecting section in the case of using the device for collecting gas generated in a secondary battery 10 according to FIG. 1.

FIG. 3a exemplarily shows the desired gas collecting section in the case of using the gas collecting device 10 according to FIG. 1. Namely, it shows the desired gas collecting sections when collecting the gas generated in the secondary battery the desired SOC section (corresponding to the charging time) and the voltage and the temperature of the secondary battery in each section. The dashed line of FIG. 3a represents the SOC section as the desired gas collecting section.

Figure 3B:
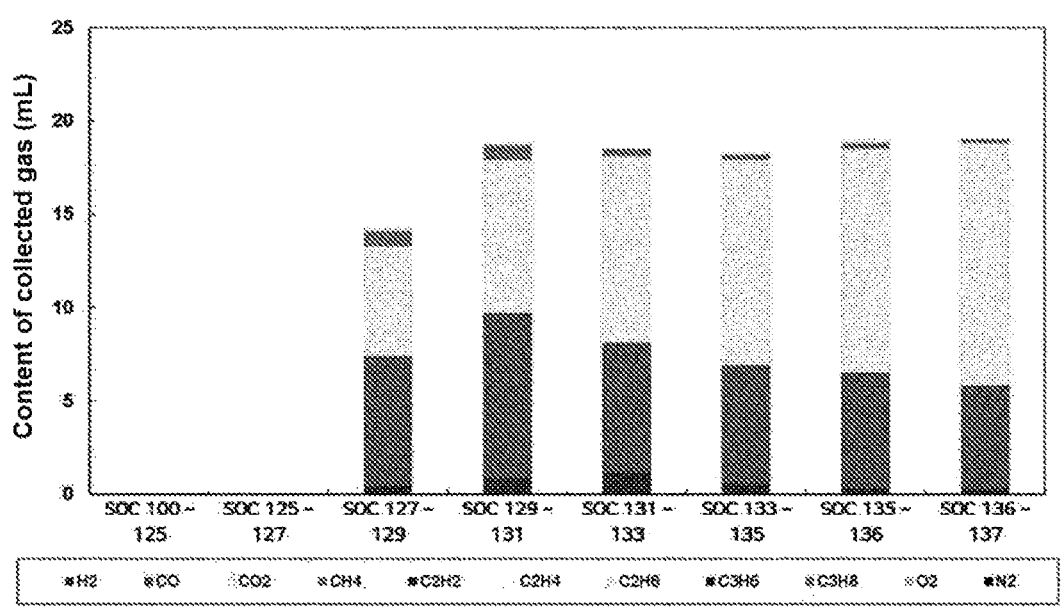

FIG. 3b exemplarily shows the results of analyzing composition and content of the gas collected by the desired section in Test Example of FIG. 3a. It shows the result of qualitatively and quantitatively analyzing the gas collected by the SOC sections (100~125, 125~127, 127~129, 129~131, 131~133, 133~135, 135~136, 136~137). Specifically, it shows the results of quantitatively analyzing the gas collected by the SOC sections in Test Example of FIG. 3a, for hydrocarbon (C1~C3) and gas ($H_2$, $CO_2$, CO, $O_2$, $N_2$) by using GC/FID, TCD.

In the specification of the present invention, the term "connection" is meant to include a direct connection between components, but also a connection between components via other components.

It should be understood that those skilled in the art can carry out other modifications without changing its technical spirit or essential features. Therefore, the above-described embodiment of the present invention is merely exemplary in all aspects and should not be construed to be limited, and it should be understood that the scope of the present invention is defined by the following claims and the meanings and ranges of the claims and all modifications and changed forms derived from their equivalents pertain to the scope of the present invention.

[Description of Symbols]
1: System for collecting inner gas of a secondary battery
10: Device for collecting gas generated in a secondary battery
20: Secondary battery
30: Pipe or tube
40: Vacuum pump
100: Gas collecting part
110: Opening and closing part of the gas collecting part
120: Main opening and closing part
130: Connecting member
140: First pressure sensor
150: Second pressure sensor
160: Opening and closing part of a vacuum pump

The invention claimed is:

1. A gas collecting device for collecting gas generated in a secondary battery, the gas collecting device comprising:
at least one gas collecting part configured to collect the gas generated in the secondary battery, the at least one gas collecting part having at least one opening and closing part, the at least one gas collecting part and the at least one opening and closing part of the gas collecting part comprising a plurality of corresponding pairs;
a main opening and closing part connected to the at least one gas collecting part, the main opening and closing part configured to be directly connected to the secondary battery through a tube so that the gas generated in the secondary battery moves to the gas collecting device through the tube;
a first pressure sensor positioned adjacent to the main opening and closing part, the first pressure sensor configured to be connected to a pipe or a tube that is connected to the secondary battery, the first pressure sensor configured to sense a change in pressure due to increase or decrease in an amount of the gas generated in the secondary battery;
a second pressure sensor connected to the at least one gas collecting part and configured to sense a change in internal pressure of the gas collecting device; and
an opening and closing part of a vacuum pump, the opening and closing part of the vacuum pump configured to be connected to a vacuum pump capable of removing interfering gas in the gas collecting device and in the secondary battery, the opening and closing part of the vacuum pump being configured to open and close a connection between the vacuum pump and the gas collecting device,
wherein the gas collecting device is configured to collect the gas generated in the secondary battery into the gas collecting part.

2. The gas collecting device according to claim 1, wherein each of the at least one opening and closing part of the gas collecting part is connected to each of the at least one gas collecting part, respectively, to open and close each of the at least one gas collecting part, and
the at least one opening and closing part of the gas collecting part is positioned between the gas collecting part and the main opening and closing part, and between the gas collecting part and the second pressure sensor.

3. The gas collecting device according to claim 2, wherein opening and closing of the at least one opening and closing part of the at least one gas collecting part are controlled, respectively, so that the gas generated in the secondary battery at different times can be collected in respective different ones of the at least one gas collecting part.

4. The gas collecting device according to claim 1, wherein each of the at least one gas collecting part is pipe-shaped.

5. The gas collecting device according to claim 1, wherein a material of the at least one gas collecting part includes at least one selected from the group consisting of: stainless steel, Teflon, metal, plastic, and a combination thereof.

6. The gas collecting device according to claim 1, wherein a volume of an internal space of the at least one gas collecting part is 1 ml to 1000 ml.

7. The gas collecting device according to claim 2, wherein each of the at least one opening and closing part of the gas collecting part is a diaphragm valve, a ball valve or a needle valve.

8. A gas collecting system for collecting the gas generated in the secondary battery, the gas collecting system comprising:
the gas collecting device according to claim 1;
the pipe or the tube connecting the gas collecting device and the secondary battery;
a vacuum pump configured to remove interfering gas in the at least one gas collecting device and in the secondary battery;
a control device configured to control opening and closing of the main opening and closing part;
an explosion-proof chamber; and
the secondary battery positioned inside of the explosion-proof chamber,
wherein the gas collecting device, the vacuum pump, and the control device are positioned outside of the explosion-proof chamber.

9. A gas collecting system for collecting the gas generated in the secondary battery, the gas collecting system comprising:
the gas collecting device according to claim 2;
the pipe or the tube connecting the gas collecting device and the secondary battery;
a vacuum pump configured to remove interfering gas in the at least one gas collecting device and in the secondary battery; and
a control device configured to control opening and closing of the main opening and closing part and the opening and closing part of the gas collecting part, respectively;

an explosion-proof chamber; and the secondary battery positioned inside of the explosion-proof chamber, wherein the gas collecting device, the vacuum pump, and the control device are positioned outside of the explosion-proof chamber.

10. A gas collecting system for collecting the gas generated in the secondary battery, the gas collecting system comprising:

the gas collecting device according to claim 1;

the pipe or the tube connecting the gas collecting device and the secondary battery;

a vacuum pump configured to remove interfering gas in the at least one gas collecting device and in the secondary battery; and a control device configured to control opening and closing of the main opening and closing part, the opening and closing part of the gas collecting part, and the opening and closing part of a vacuum pump, respectively;

an explosion-proof chamber; and the secondary battery positioned inside of the explosion-proof chamber, wherein the gas collecting device, the vacuum pump, and the control device are positioned outside of the explosion-proof chamber.

11. A gas collecting system for collecting the gas generated in the secondary battery, the gas collecting system comprising:

the gas collecting device according to claim 1;

the pipe or the tube connecting the gas collecting device and the secondary battery; and a vacuum pump configured to remove interfering gas in the at least one gas collecting device and in the secondary battery.

12. A method for collecting the gas generated in the secondary battery into the gas collecting device by using the gas collecting system according to claim 8, the method comprising:

connecting the secondary battery and the gas collecting device with the pipe or the tube; and controlling opening and closing of the main opening and closing part with the control device to collect the gas generated in the secondary battery in the at least one gas collecting part.

13. A method for collecting the gas generated in the secondary battery into the gas collecting device by using the gas collecting system according to claim 9, the method comprising:

connecting the secondary battery and the gas collecting device with the pipe or the tube; and controlling opening and closing of the main opening and closing part and the at least one opening and closing part of the gas collecting part with the control device, to collect the gas generated in the secondary battery in the at least one gas collecting part.

14. A method for collecting the gas generated in the secondary battery into the gas collecting device by using the gas collecting system according to claim 10, the method comprising:

connecting the secondary battery and the gas collecting device with the pipe or the tube; and controlling opening and closing of the main opening and closing part, the at least one opening and closing part of the gas collecting part, and the opening and closing part of a vacuum pump with the control device, to collect the gas generated in the secondary battery in the at least one gas collecting part.

15. A method for collecting the gas generated in the secondary battery into the gas collecting device by using the gas collecting system according to claim 11, the method comprising:

connecting the secondary battery and the gas collecting device with the pipe or the tube; and collecting the gas generated in the secondary battery in the at least one gas collecting part.

* * * * *